United States Patent
Dalmatov

(10) Patent No.: US 10,338,825 B2
(45) Date of Patent: *Jul. 2, 2019

(54) MANAGING SSD WEAR RATE IN HYBRID STORAGE ARRAYS

(71) Applicant: EMC IP Holding Company LLC, Hopkinton, MA (US)

(72) Inventor: Nickolay A. Dalmatov, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 237 days.

This patent is subject to a terminal disclaimer.

(21) Appl. No.: 15/334,917

(22) Filed: Oct. 26, 2016

(65) Prior Publication Data

US 2017/0285973 A1 Oct. 5, 2017

(30) Foreign Application Priority Data

Mar. 31, 2016 (RU) ................................ 2016112139

(51) Int. Cl.
*G06F 3/06* (2006.01)

(52) U.S. Cl.
CPC .......... *G06F 3/0616* (2013.01); *G06F 3/0647* (2013.01); *G06F 3/0653* (2013.01); *G06F 3/0665* (2013.01); *G06F 3/0685* (2013.01); *G06F 2212/7208* (2013.01)

(58) Field of Classification Search
CPC .... G06F 3/0616; G06F 3/0688; G06F 3/0653; G06F 3/064
See application file for complete search history.

(56) References Cited

U.S. PATENT DOCUMENTS

| | | | | |
|---|---|---|---|---|
| 7,315,917 B2 * | 1/2008 | Bennett | ............... | G06F 12/0246 711/100 |
| 2009/0300277 A1 * | 12/2009 | Jeddeloh | ............. | G06F 12/0246 711/104 |

OTHER PUBLICATIONS

Eran Gal, Algorithms and Data Structures for Flash Memories, Jun. 2005, ACM Computing Surveys, vol. 37, pp. 138-163.*

* cited by examiner

*Primary Examiner* — Reginald G Bragdon
*Assistant Examiner* — Hannah A Faye
(74) *Attorney, Agent, or Firm* — Krishnendu Gupta; Lesley Leonessa

(57) ABSTRACT

A technique for use in balancing flash drive wear in data storage systems is disclosed. Multiple sets of flash drives are identified where data is stored as multiple slices striped across the set of flash drives. A write rate at which data will be written to the multiple slices stored on the set of flash drives during a next time interval is predicted. A number of bytes that can be written to each set of flash drives is determined. A metric representative of a wear rate is determined for each set of flash drives. HDD relocation candidates are identified and a relocation process to relocate identified slices initiated.

6 Claims, 14 Drawing Sheets

| | File system metadata 312 | Application critical 314 | I/O workload 316 | Slice ID 318 |
|---|---|---|---|---|
| DM1 320a | Yes | No | X1 IOs per second | A1 |
| DM2 320b | Yes | No | X2 IOs per second | A2 |
| DM3 320c | No | Yes | X3 IOs per second | A3 |
| DM4 320d | No | Yes | X4 IOs per second | A4 |
| DM5 320e | No | No | X5 IOs per second | A5 |
| DM6 320f | No | No | X6 IOs per second | A6 |
| DM7 320g | No | No | X7 IOs per second | A7 |

List of proposed data movements 310

List of proposed data movements 410

| | Primary criteria A 412 | Primary criteria B 414 | Primary Criteria C 415 | I/O workload 416 | Slice ID 418 |
|---|---|---|---|---|---|
| DM1 420a | Yes | Yes | Yes | X1 IOs per second | A1 |
| DM2 420b | Yes | Yes | No | X2 IOs per second | A2 |
| DM3 420c | Yes | No | Yes | X3 IOs per second | A3 |
| DM4 420d | No | Yes | Yes | X4 IOs per second | A4 |
| DM5 420e | No | No | No | X5 IOs per second | A5 |
| DM6 420f | No | No | No | X6 IOs per second | A6 |
| DM7 420g | No | No | No | X7 IOs per second | A7 |

List of proposed data movements 510

| Application priority 512 | QOS 514 | I/O workload 516 | Slice ID 518 |
|---|---|---|---|
| 1 | 1 | X1 IOs per second | A1 |
| 1 | 2 | X2 IOs per second | A2 |
| 2 | 1 | X3 IOs per second | A3 |
| 2 | 1 | X4 IOs per second | A4 |
| 3 | 1 | X5 IOs per second | A5 |
| 3 | 2 | X6 IOs per second | A6 |
| 3 | 3 | X7 IOs per second | A7 |

MANAGING SSD WEAR RATE IN HYBRID STORAGE ARRAYS

TECHNICAL FIELD

The present invention relates to managing solid state drive wear rate in hybrid data storage arrays.

BACKGROUND OF THE INVENTION

Storage devices are employed to store data that are accessed by computer systems. Examples of basic storage devices include volatile and non-volatile memory, floppy drives, hard disk drives, tape drives, and optical drives. A storage device may be locally attached to an input/output (IO) channel of a computer. For example, a hard disk drive may be connected to a computer's disk controller. A storage device may also be accessible over a network. Examples of such storage devices include network attached storage (NAS) and storage area network (SAN) devices. A storage device may be a single stand-alone component or be comprised of a system of storage devices such as in the case of Redundant Array of Inexpensive Disks (RAID) groups.

A traditional RAID group is a collection of hard disk drives operating together logically as a unified storage device, e.g., to provide some data protection through redundancy. Storage devices with RAID groups are designed to store large quantities of data and typically include one or more storage array processors (SPs), for handling both requests for allocation and IO requests.

Many computing devices now include non-volatile memory (NVM), such as certain magnetic, semiconductor, and/or optical storage media, and may include removable disk systems, hard drives, and other storage media systems allowing the device and/or a user to store data the device uses or is directed to use. The characteristics of non-volatile, vibration-free, small size, and low power consumption have made a type of NVM known as flash memory an excellent component to be utilized in various storage systems.

Flash storage devices are widely used as memory storage for consumer system products such as a notebook, desktop computer, set top box, digital camera, mobile phone, PDA and GPS. The increasing demand for more storage in these products has driven the need to expand the capacity of flash storage devices.

Advances in flash semiconductor technology continue to decrease the cost per unit and increase the capacities of flash devices. Further, flash devices can provide a significant performance advantage over magnetic disk media in many storage system applications. As cost continues to decrease, there is an industry shift underway towards the use of semiconductor solid state drives (also known as solid state disks or SSDs) using flash memory devices as a storage media in storage arrays.

An SSD has many features that can make it an attractive storage device. For example, SSDs have a fast access rate, high throughput, a high integration density, and stability against an external impact. SSDs can move large amounts of data and process a large number of IO requests. This allows users to complete data transactions much more quickly. Thus, in at least some cases, there has been an increasing trend towards the use of SSDs as storage devices instead of, or in addition to, magnetic disks.

However, unlike an HDD employing magnetic disks, SSDs utilizing flash memory devices have a limited number of program/erase (PE) cycles (also referred to as writes or write operations) before the SSD becomes unreliable. The number of PE cycles can vary and SSDs may be categorized based on their number of PE cycles. For example, an SSD may be classified as low endurance (LE), medium endurance (ME) or high endurance (HE) SSD.

SUMMARY OF THE INVENTION

A technique for use in balancing flash drive wear in data storage systems is disclosed. Multiple sets of flash drives are identified where data is stored as multiple slices striped across the set of flash drives. A write rate at which data will be written to the multiple slices stored on the set of flash drives during a next time interval is predicted. A number of bytes that can be written to each set of flash drives is determined. A metric representative of a wear rate is determined for each set of flash drives. HDD relocation candidates are identified and a relocation process to relocate identified slices initiated.

BRIEF DESCRIPTION OF THE DRAWINGS

Features and advantages of the present invention will become more apparent from the following detailed description of exemplary embodiments thereof taken in conjunction with the accompanying drawings in which:

FIGS. 7A-7C are examples illustrating different criteria that may be used in connection with ranking a list of proposed data movements of slices in an embodiment in accordance with techniques herein;

DETAILED DESCRIPTION

Figure 1:
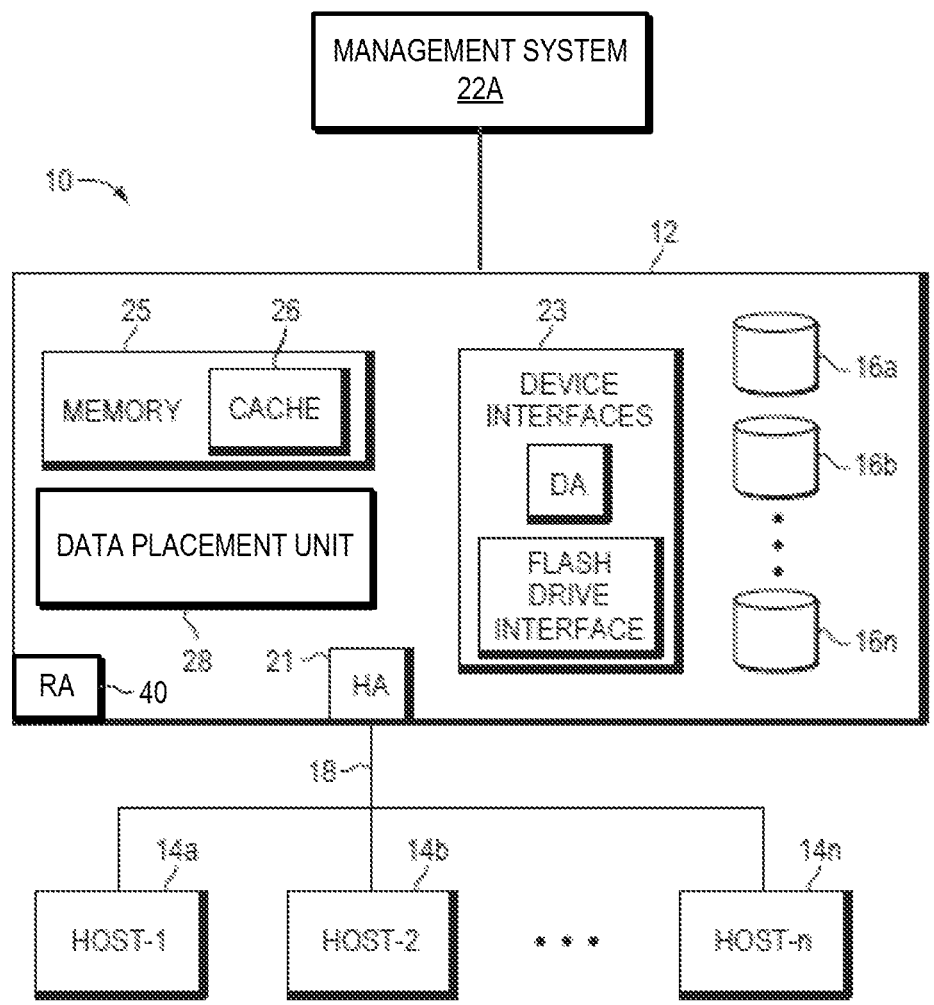
FIG. 1 is an example of a system that may utilize the technique described herein.

Data storage systems may include different types of storage devices, such as solid state drives (SSDs) and hard disk drives. SSDs are typically specified as having an expected lifetime (e.g., as measured in an amount of actual elapsed time such as a number of years or months) based on a number of guaranteed write cycles at a particular rate or frequency at which the writes are performed. Thus, an SSD may have a specified lifetime rating expressed in calendar or wall clock elapsed time based on the amount of time it takes to perform the number of guaranteed write cycles. SSDs comprising flash memory devices may also be referred to herein as flash drives; however the techniques described herein may utilize SSDs that employ other memory technology such as nonvolatile Random Access Memory (NRAM), phase-change RAM (PRAM), ferroelectric RAM (FERAM), magnetoresistive RAM (MRAM), resistance-change RAM (RRAM), and the like.

An SSD may be specified as having a physical size and a logical size. The physical size (also referred to herein as "physical space") or capacity represents the total amount of memory available on the device. The logical size (also referred to herein as "logical space") is the amount memory allocated to a user for storing user data. The remaining amount of space is reserved for data management processes, and may be referred to herein as over-provisioning. For example, physical size may be 256 GB and the logical size may be 200 GB. The remaining 56 GB may be reserved for over-provisioning.

Logical to physical size is typically chosen such that the SSD can meet a particular specification, such as a rated lifetime specification based on an expected rate at which the writes will be performed. The allocation of over-provisioning space to logical space may be expressed as a ratio and varies based on intended application taking into account desired endurance and performance characteristics (as used herein, such ratio may be referred to as "over-provisioning ratio" or "allocation ratio"). For example, over-provisioning values may vary from as low as 2-5% for inexpensive consumer applications to upwards of 60-70% for high-performance MLC flash enterprise applications.

An SSD can be queried to determine the drive's effective write rate. Wear rate may be monitored based upon a particular implementation criteria. For instance, wear rates may be monitored hourly, daily, weekly, or monthly as desired based upon operating demand placed on the system. For example, querying an SSD may indicate that it's been written to 10 K times after one month of operation. If writes continue at the same rate, the SSD will be written to 120 K times per year. After five years, a common warranty period, the SSD will be written to 600 K times. If the SSD is warranted for say 500 K writes, the SSD can be expected to fail in less than 5 years which would be within the warranty period, resulting in increased maintenance costs and a dissatisfied customer.

Advantageously, techniques described herein disclose a method to estimate the rate at which writes will occur to a particular SSD. The warranty period for the SSD can be determined. The technique further determines if writes at the estimated rate will result in reaching the SSD's end of warranty period before the warranty period expires. If so, data can be moved to drives having a lower write rate. The method may be performed across substantially all a storage array's SSDs such that substantially all the SSDs will wear at the same rate, thereby balancing wear across all the SSDs.

For example, consider the scenario where writes are estimated at say 4 K per month, or 48 K per year. If the SSD drive is rated for 500 K writes over its lifetime, and writes continue at this rate, the drive may last over 10 years. In this case, the amount write activity may be increased, thereby, improving system performance by increasing the rate at which writes are directed to the SSD. However, if writes are estimated to occurs at say 120 K per year, or 600 K in 5 years, the drive may wear out before the end of the 500 K write warranty period. In this case, the write wear rate can be reduces by relocating slices (e.g., write heavy slices) to a different SSD experience a lower write rate.

Consequently, employing techniques described herein may be used to increase and/or decrease the wear rate for multiple SSDs to balance wear across the multiple SSDs and potentially improve system performance. In this case, the technique may be used to monitor the rate at which writes are directed to an SSD and if it is determined that the rate is high enough such that the drive may be expected to fail sooner than expected, logical space can be decreased to slow the number of writes directed to the drive and in create the relative amount of over-provisioning space available for data management and storage operations. As a result, the method will slow the rate at which the SSD wears. If it is determined that the writes are so low such that the expected lifetime of the drive is significantly beyond the intended use, and performance may be improved by increasing the number of writes directed to the SSD. By continuously monitoring the rate, the amount of memory allocated for logical space may be increased or decreased in order to tailor the wear rate so as to ensure the SSD lasts as long as intended while providing maximum performance during its lifetime.

Advantageously, the techniques can allow a data storage system to balance the SSD wear rate by dynamically adjusting the wear rate as workloads change. Such changes may occur over time. For example, workloads may increase when the system is first put into production. As applications and data are loaded onto the system and as the system ramps up, it stores more and more data thereby approaching capacity. In this case, it may be desirable to reduce or slow the rate at which data is written to the system. Alternatively, workloads may decrease as new systems are installed. Applications and data may be moved from one or more existing system onto the new system thereby decreasing workloads on the existing system. As the storage system reaches end-of-life, applications may continue to be migrated elsewhere thus reducing the wear rate and, in this case, memory allocated for capacity may be increased to provide additional performance boost.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (IO) operations or data requests. The communication medium 18 may be any one or more of a variety of networks or other type of communication connections as known to those skilled in the art. The communication medium 18 may be a network connection, bus, and/or other type of data link, such as a hardwire, wireless, or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, PCIe, iSCSI, NFS, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, the techniques described herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash memory-based SSDs (also referred to herein as "flash disk drives," "flash storage drives", or "flash drives") are one type of SSD that contains no moving mechanical parts.

The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class SSDs (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. Furthermore, the data storage devices 16a-16n may be connected to one or more controllers (not shown). The controllers may include storage devices associated with the controllers. Communications between the controllers may be conducted via inter-controller connections. Thus, the current techniques described herein may be implemented in conjunction with data storage devices that can be directly connected or indirectly connected through another controller.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

A map kept by the storage array may associate logical addresses in the host visible LUs with the physical device addresses where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters. This information can be analyzed to derive a temperature of the slices which can indicate the activity level of data at the slice level.

The map, or another similar map, may also be used to store information related to write activity (e.g., erase count) for multiple drives in the storage array. This information can be used to identify drives having high write related wear relative to other drives having a relatively low write related wear.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® Data Storage System by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like.

Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 10K RPM rotating disk drives. In terms of general expected performance, the SSD or flash tier may be considered the highest performing tier. The second tier of 15K RPM disk drives may be considered the second or next highest performing tier and the 10K RPM disk drives may be considered the lowest or third ranked tier in terms of expected performance. The foregoing are some examples of tier definitions and other tier definitions may be specified and used in an embodiment in accordance with techniques herein.

Figure 2:
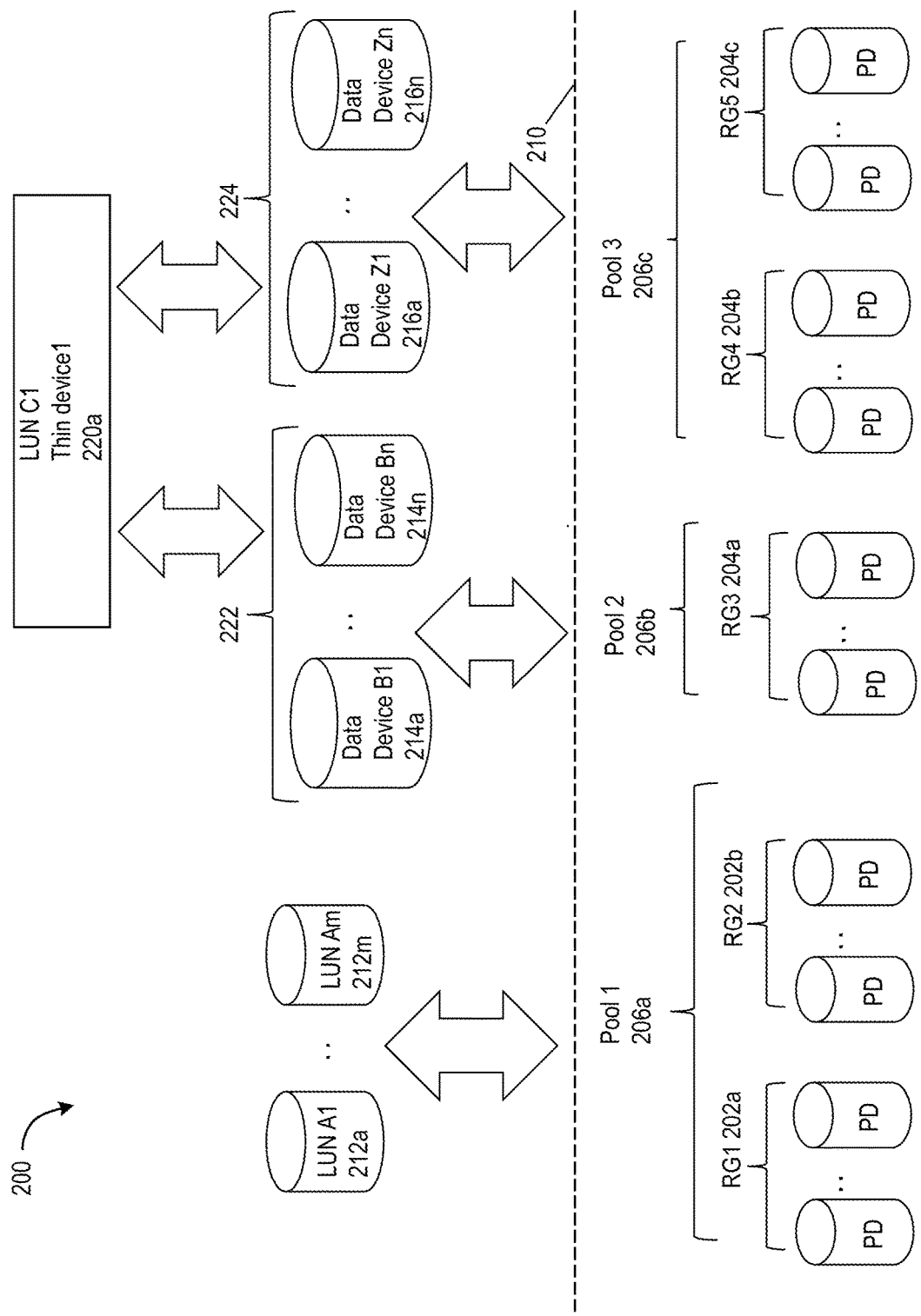
FIG. 2 is an example representation of physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

With reference to FIG. 2, a first pool, pool 1 206a, may include two RAID groups (RGs) of 10K RPM rotating disk drives of a first storage tier. The foregoing two RGs are denoted as RG1 202a and RG2 202b. A second pool, pool 2 206b, may include 1 RG (denoted RG3 204a) of 15K RPM disk drives of a second storage tier of PDs having a higher relative performance ranking than the first storage tier of 10K RPM drives. A third pool, pool 3 206c, may include 2 RGs (denoted RG 4 204b and RG 5 204c) each of which includes only flash-based drives of a third highest performance storage tier of PDs having a higher relative performance ranking than both the above-noted first storage tier of 10K RPM drives and second storage tier of 15K RPM drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-c of the physical view of storage may be further configured into one or more logical entities, such as LUNs or more generally, logical devices. For example, LUNs 212a-m may be thick or regular logical devices/LUNs configured or having storage provisioned, from pool 1 206a. LUN 220a may be a virtually provisioned logical device, also referred to as a virtually provisioned LUN, thin device or thin LUN, having physical storage configured from pools 206b and 206c. A thin or virtually provisioned device is described in more detail in following paragraphs and is another type of logical device that may be supported in an embodiment of a data storage system in accordance with techniques herein.

Generally, a data storage system may support one or more different types of logical devices presented as LUNs to clients, such as hosts. For example, a data storage system may provide for configuration of thick or regular LUNs and also virtually provisioned or thin LUNs, as mentioned above. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity.

The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In one embodiment, a thin device may be implemented as a first logical device, such as 220a, mapped to portions of one or more second logical devices, also referred to as data devices. Each of the data devices may be subsequently mapped to physical storage of underlying storage pools. For example, portions of thin device 220a may be mapped to corresponding portions in one or more data devices of the first group 222 and/or one or more data devices 216a-n of the second group 224. Data devices 214a-n may have physical storage provisioned in a manner like thick or regular LUNs from pool 206b. Data devices 216a-n may have physical storage provisioned in a manner like thick or regular LUNs (e.g., similar to LUNs A1-Am 212a-212m) from pool 206c. Thus, portions of thin device 220a mapped to data devices of 222 have their data stored on 15K RPM PDs of pool 206b, and other portions of thin device 220a mapped to data devices of 224 have their data stored on flash PDs of pool 206c. In this manner, storage for different portions of thin device 220a may be provisioned from multiple storage tiers.

In at least one embodiment as described herein, the particular storage tier upon which a data portion of a thin device is stored may vary with the I/O workload directed to that particular data portion. For example, a first data portion of thin device 220a having a high I/O workload may be stored on a PD of pool 206c by mapping the first logical address of the first data portion in the thin LUN's address space to a second logical address on a data device in 224. In turn the second logical address of the data device in 224 may be mapped to physical storage of pool 206c. A second data portion of thin device 220a having a lower I/O workload than the first data portion may be stored on a PD of pool 206b by mapping the third logical address of the second data portion in the thin LUN's address space to a fourth logical address on a data device in 222. In turn the fourth logical address of the data device in 222 may be mapped to physical storage of pool 206b. As the I/O workload of the foregoing two data portions of thin device 220a may vary, the data portions may be relocated to a different storage tier. For example, if the workload of the second data portion greatly increases at a later point in time, the second data portion may be relocated or moved to pool 206c by mapping its corresponding third logical address in the thin device 220a's address space to a fifth logical address of a data device in 224 where the fifth logical address is mapped to physical storage on pool 206c. The foregoing is described in more detail elsewhere herein.

In some embodiments, the data devices of 222 and 224 may not be directly useable (visible) to hosts coupled to a data storage system. Each of the data devices may correspond to one or more portions (including a whole portion) of one or more of the underlying physical devices. As noted above, the data devices 222 and 224 may be designated as corresponding to different performance classes or storage tiers, so that different ones of the data devices of 222 and 224 correspond to different physical storage having different relative access speeds and/or different RAID protection type (or some other relevant distinguishing characteristic or combination of characteristics), as further discussed elsewhere herein.

Figure 3:
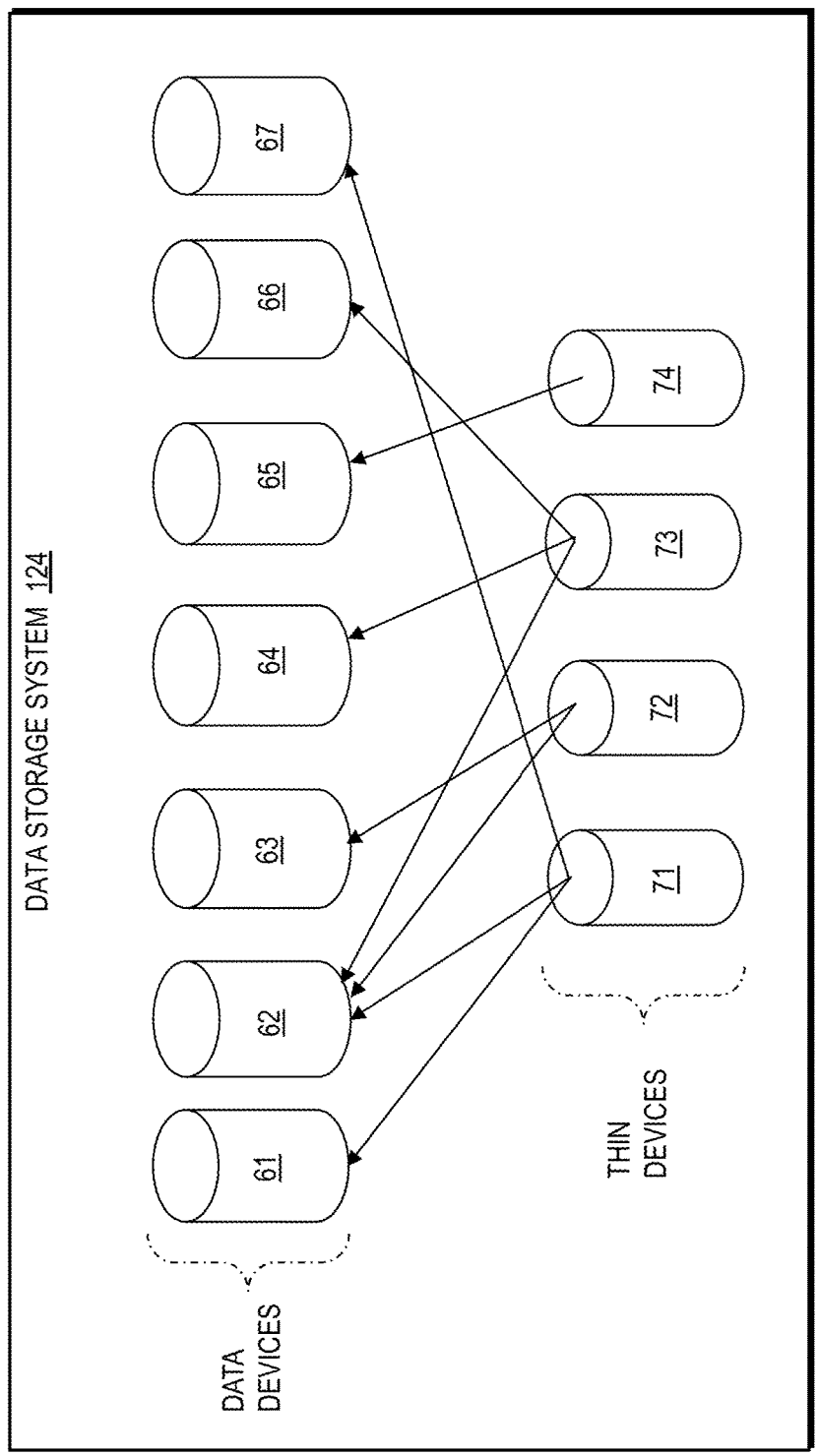
FIGS. 3, 4, and 5 are block diagrams illustrating aspects of implement thin or virtually provisioned logical devices in an embodiment in accordance with techniques herein.

As shown in FIG. 3, the data storage system 124 may also include a plurality of thin devices 71-74 that may be adapted for use in connection with the system described herein when using thin provisioning. Consistent with discussion elsewhere herein, in a system using thin provisioning, the thin devices 71-74 may appear to a host coupled to the storage system 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 4:
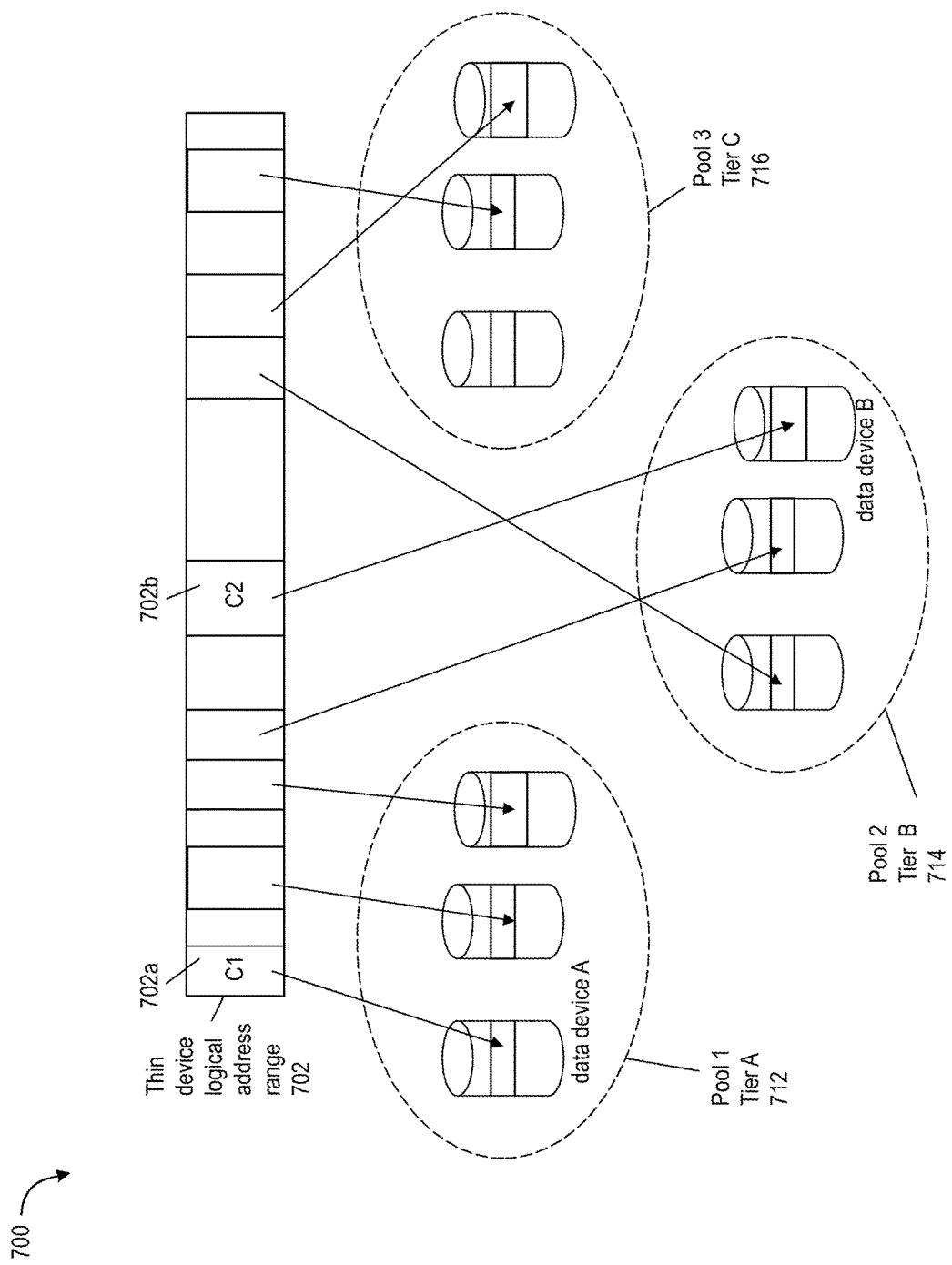

Referring to FIG. 4, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of 15K RPM storage devices, and pool 716 may represent a storage pool of tier C of 10K RPM storage devices. Each storage pool may include a plurality of logical devices which are data devices mapped to the pool's underlying physical devices (or portions thereof). Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 5:
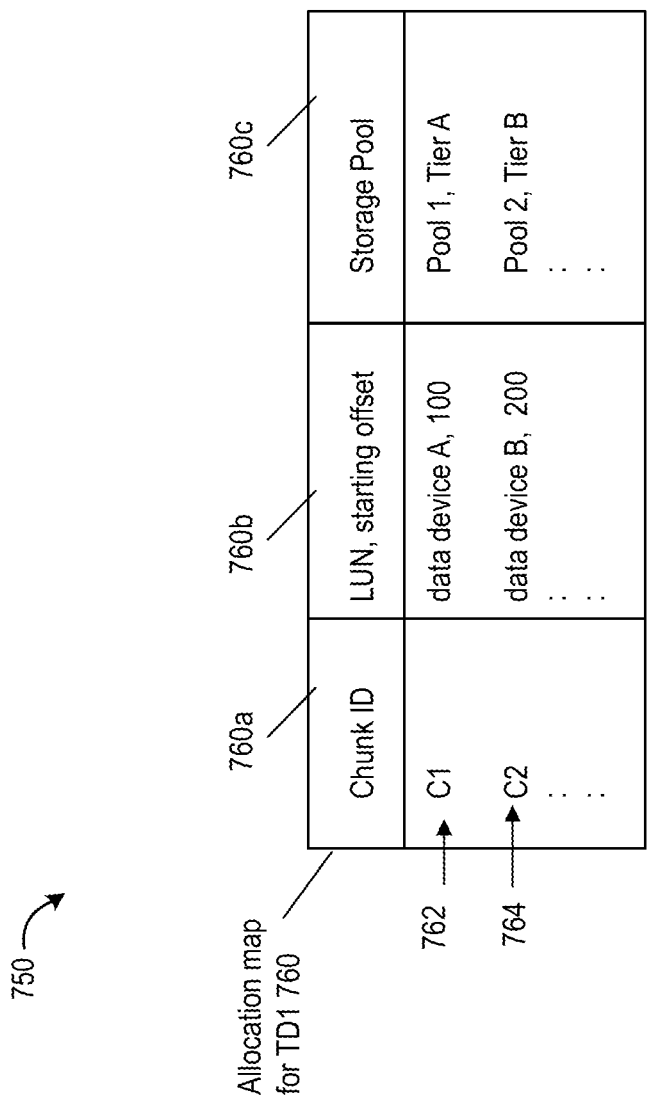

Referring to FIG. 5, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 4 such as in connection the mapping of 702 to different storage pool devices. The allocation map 760 may contain an entry for each chunk and identify which data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 4 as 702a and entry 764 represents chunk C2 illustrated in FIG. 4 as 702b. It should be noted that although not illustrated, the allocation map may include or otherwise use other tables and structures which identify a further mapping for each data device such as which physical device locations map to which data devices. This further mapping for each data device is described and illustrated elsewhere herein. Such information as illustrated and described in connection with FIG. 5 may be maintained for each thin device in an embodiment in accordance with techniques herein.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), entitled AUTOMATED INFORMATION LIFE-CYCLE MANAGEMENT WITH THIN PROVISIONING, and U.S. Pat. No. 7,949,637, Issued May 24, 2011, entitled STORAGE MANAGEMENT FOR FINE GRAINED TIERED STORAGE WITH THIN PROVISIONING, both of which are incorporated by reference herein.

Figure 6:
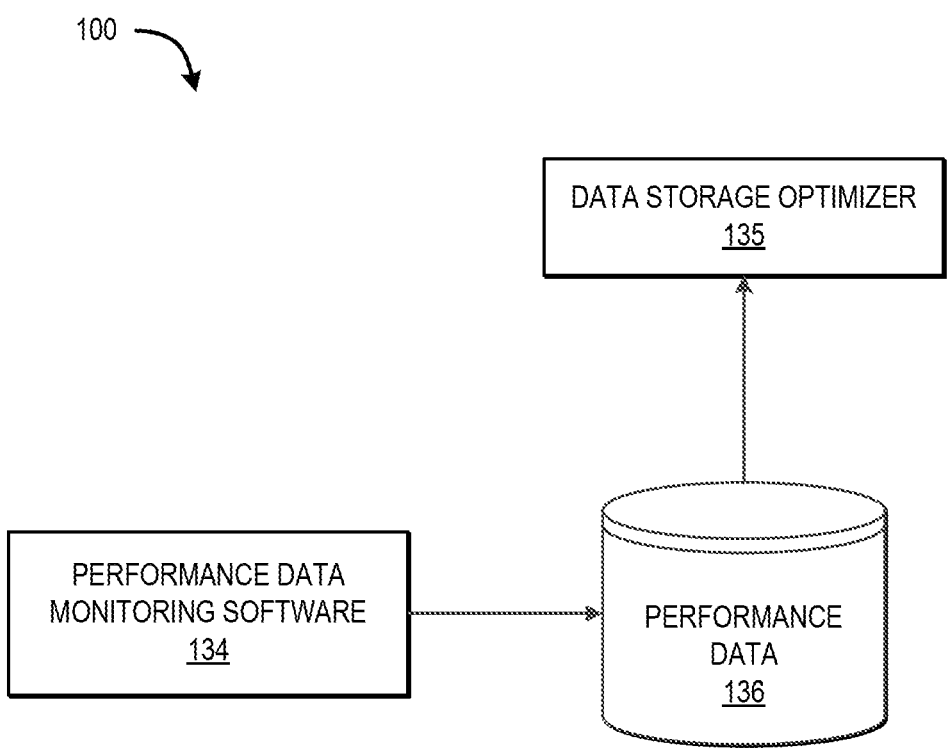
FIG. 6 is an example illustrating data and software components that may be used in an embodiment in accordance with techniques herein.

Referring to FIG. 6, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, a wear rate for one or more physical devices, a pool or group of physical devices, logical devices or volumes (e.g., LUNs), thin or virtually provisioned devices (described in more detail elsewhere herein), portions of thin devices, and the like. The wear rate may also be a measurement or level of "how busy" a device is, for example, in terms of write operations or PE cycles.

In one embodiment in accordance with techniques herein, components of FIG. 6, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

It should be noted that the back-end (e.g., physical device) write operations with respect to a LUN, thin device, and the like, may be viewed as write requests or commands from the DA 23, controller or other backend physical device interface. Thus, these are operations may also be characterized as a number of operations with respect to the physical storage device (e.g., number of physical device writes based on physical device accesses). This is in contrast to observing or counting a number of particular type of I/O requests (e.g., reads or writes) as issued from the host and received by a front end component such as an HA 21. For example, when writing data of a received host I/O request to the physical device, the host write request may result in multiple reads and/or writes by the DA 23 in addition to writing out the host or user data of the request. If the data storage system implements a RAID data protection technique, such as RAID-5, additional reads and writes may be performed such as in connection with writing out additional parity information for the user data. Thus, observed data gathered to determine wear rate, such as observed numbers writes may refer to the write requests or commands performed by the DA. Such write commands may correspond, respectively, to physical device accesses such as disk writes that may result from a host I/O request received by an HA 21.

The optimizer 135 may perform processing to determine how to allocate or partition physical storage in a multi-tiered environment for use by multiple applications. The optimizer 135 may perform processing such as, for example, to determine what particular portions of LUNs, such as thin devices, to store on physical devices of a particular tier, evaluate when to move data between physical drives of different pools, tiers, and the like. Such data portions of a thin device may be automatically placed in a storage pool. The data portions may also be automatically relocated or moved to a different storage pool as the SSD wear rate and observed performance characteristics for the data portions change over time. In accordance with techniques herein, analysis of wear rate for data portions of thin devices may be performed in order to determine whether particular data portions should have their data contents stored on physical devices located in a particular storage pool. It should be noted that the optimizer 135 may generally represent one or more components that perform processing as described herein as well as one or more other optimizations and other processing that may be performed in an embodiment.

Promotion may refer to movement of data from a source storage tier to a target storage tier where the target storage tier is characterized as having devices of higher performance than devices of the source storage tier. For example movement of data from a tier of 10K RPM drives to a tier of SSDs may be characterized as a promotion and may be performed when the SSD wear rate directed to the relocated data increases. Demotion may refer generally to movement of data from a source storage tier to a target storage tier where the source storage tier is characterized as having devices of higher performance than devices of the target storage tier. For example movement of data from a tier of SSDs to a tier of 10K RPM drives may be characterized as a demotion and may be performed when the SSD wear rate directed to the relocated data decreases.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space.

The embodiment may allocate physical storage for thin LUNs in allocation units referred to as chunks. In some cases, there may be multiple chunks in a single slice (e.g. where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

In at least one embodiment of a data storage system using techniques described herein, a fixed size slice may be used for each LUN's logical address space. For example, the size of each slice may be 256 megabytes (MB) thereby denoting that I/O statistics are collected for each 256 MB portion of logical address space and where data movement optimizations are performed which relocate or move data portions which are 256 MB in size. In such an embodiment, data may be allocated for thin devices in chunks where, generally, the size of a slice is some integer multiple of a chunk (e.g., there may be one or multiple chunks in a single slice). In at least one embodiment, storage may be allocated for thin devices in chunks which are each 256 MB or the same size as a slice whereby the size granularity for data movement, thin device allocation and statistics collection may be the same.

In one embodiment, I/O statistics or metrics maintained for slices, or more generally, data portions, of a LUN may reflect I/O activity or SSD wear rate expressed, for example, write operation per hour and wear ratio (as will be further explained below). It should be noted that more generally, any suitable I/O statistic may be used to measure the SSD wear rate of data portions to select which data portions belong on which SSD.

In one embodiment in accordance with techniques herein, the data storage optimizer may collect information regarding SSD wear rate of data portions for one or more time periods and use such information in connection with predicting and modeling SSD wear rate of the data portions for the next time period. Based on predicted SSD wear rates for the data portions, for example, for a next time period N+1, the data storage optimizer may select data portions for placement or movement to different SSDs. The data storage system may model the movement or placement of the data portions for the next time period N+1 using the predicted SSD wear rates for the data portions in order to determine, for example, overall data storage system performance, per storage tier performance, and the like. Based on such modeled or simulated performance of the data storage system, storage pools or tiers, and the like, if a selected set of data portion movements were performed, a decision may be made as to whether to actually implement or perform the modeled data movements or otherwise consider an alternative set of data movements.

What will now be described are further aspects of the criteria that may be used in an embodiment in accordance with techniques herein to rank the list of proposed data movements. For example, consider an embodiment which uses criteria for each slice including I/O workload, whether the slice proposed for data movement includes file system metadata, and whether the slice proposed for data movement includes data for a performance critical application. Primary criteria may be specified which includes whether the slice proposed for data movement includes file system metadata, and whether the slice proposed for data movement includes data for a performance critical application. Secondary criteria may be specified which includes the I/O workload for each slice. In such an embodiment, the proposed data movements may be ranked first in accordance with the primary criteria and then in accordance with the secondary criteria.

To further illustrate, reference is made to the example 300 of FIG. 7A which includes a list of proposed data movements (DMs) 310 determined in accordance with techniques herein. The list 310 may be ranked in accordance with the primary and secondary criteria as just described above. The list 310 may include a row of information as may be used in an embodiment in accordance with techniques herein for each slice proposed for data movement in one of the proposed data movements output by the data storage optimizer. Each entry in the ranked list 310 may have a position in the ranked list determined in accordance with the primary and secondary criteria. Each entry in 310 may denote a proposed data movement and may include an indicator 312 identifying whether the affected slice includes file system metadata, an indicator 314 identifying whether the affected slice includes application data of an application that has been characterized (such as through user-specified inputs or configuration) as performance critical, the I/O workload 316 for the affected slice (e.g., as determined using EQUATION 1), and an identifier 318 for the slice of the proposed data movement. DMs 320a-320g denote the particular proposed data movements as ranked in the list where DM 320a denotes the highest ranked data movement and DM 320g denotes the lowest ranked data movement. Based on primary and secondary criteria described above, columns 312 and 314 include indicators of the primary criteria and column 316 includes information of the I/O workload of the secondary criteria. DMs 320a-320d each include an indicator set for one of the primary criteria and DMs 320e-320g do not include an indicator set for one of the primary criteria. Since DMs 320a-d each include one indicator of the primary criteria, the DMS 320a-d are then ranked based on the secondary criteria of I/O workload denoted by column 316 values. The higher the I/O workload, the higher the ranking of the proposed DM. Thus, in this example, assume X1>X2>X3>X4 resulting in the ranking of 320a-d as in the example 300. Since DMs 320e-g do not meet any of the primary criteria, the DMs 320e-g are ranked lower than DMs 320a-d. DMs 320e-g are then ranked based on the secondary criteria of I/O workload denoted by column 316 values. The higher the I/O workload, the higher the ranking of the proposed DM. In this example, assume X5>X6>X7 thereby resulting in the ranking of 320e-g as in the example 300.

Thus, the proposed DMs 320a-g are first ranked based on the primary criteria and then, for a set of DMs equally ranked based on primary criteria, the set is then ranked based on the secondary criteria.

In such an embodiment as described above using criteria as illustrated in determining the ranked list of FIG. 7A, each of the primary criteria in 312 and 314 may be equally weighted.

More generally, an embodiment may include more than 2 types of primary criteria each of which may be denoted by a flag or indicator having a binary value as described. In such an embodiment, each of the primary criteria may be equally weighted to determine a total number of indicators of the primary criteria which are set (=yes or applicable) to the slice of the proposed data movement. In this case the proposed DMs may be first ranked based on the total number of primary criteria flags or indicators applicable to each proposed DM slice.

Referring to FIG. 7B, shown is an example 400 including a list of proposed data movements 410 that may be determined in an embodiment in accordance with techniques herein. The list 410 may be ranked in accordance with the primary and secondary criteria as just described above. However, the example 400 illustrates a ranked list of proposed DMs 420a-g in accordance with primary criteria including 3 indicators rather than 2 above and including secondary criteria as described above of I/O workload.

The list 410 may include a row of information as may be used in an embodiment in accordance with techniques herein for each slice proposed for data movement in one of the proposed data movements output by the data storage optimizer. Each entry in the ranked list 410 may have a position in the ranked list determined in accordance with the primary and secondary criteria. Each entry in 410 may denote a proposed data movement and may include values for flags or indicators 412, 414 and 415 of primary criteria, the I/O workload 416 for the affected slice (e.g., as determined using EQUATION 1), and an identifier 418 for the slice of the proposed data movement. DMs 420a-420g denote the particular proposed data movements as ranked in the list where DM 420a denotes the highest ranked data movement and DM 420g denotes the lowest ranked data movement. Based on primary and secondary criteria in this example, columns 412, 414 and 415 include indicators of the primary criteria and column 416 includes information of the I/O workload of the secondary criteria. In this example, each of the primary criteria indicators may be weighted equally whereby a total number of flags or indicators set or applicable to the affected slice of each data movement may be determined as follows:

Data movementTotal number of primary criteria flags set
420a 3
420b-d 2
420e-g 0

Since DM 420a is the only DM with all 3 primary criteria indicators set, it is ranked first/highest. Since DMs 420b-d each include two indicators of the primary criteria set, the DMs 420b-d are then further ranked based on the secondary criteria of I/O workload denoted by column 416 values. The higher the I/O workload, the higher the ranking of the proposed DM. Thus, in this example, assume X2>X3>X4 resulting in the ranking of 420b-d as in the example 400. Since DMs 420e-g do not meet any of the primary criteria, the DMs 420e-g are ranked lower than DMs 420a-d. DMs 420e-g are then ranked based on the secondary criteria of I/O workload denoted by column 416 values. The higher the I/O workload, the higher the ranking of the proposed DM. In this example, assume X5>X6>X7 thereby resulting in the ranking of 420e-g as in the example 400.

Thus, the proposed DMs 420a-g are first ranked based on the primary criteria and then, for a set of DMs equally ranked based on primary criteria, the set is then ranked based on the secondary criteria. More generally, the primary and/or secondary criteria may each include more than one criterion.

As a variation to the foregoing, rather than have criteria, such as the primary criteria in FIGS. 7A and 7B, be equally weighted, an embodiment may associate different weights or priorities with each of the different primary criteria to determine a final primary criteria score. The score may be generally determined as expressed in EQUATION 2 below:

$$\text{Score} = (PC1 * W1) + (PC2 * W2) + \ldots (PCn * Wn)$$

where

"Score" is the total score for the primary criteria of a particular proposed data movement;

"PC1" through "PCn" denotes the N primary criteria (PC) where each $PC_i$, $1 \leq i \leq N$, denotes a different one of the primary criteria and N may generally be an integer greater than 0;

"W1" through "Wn" denotes the weights associated with the N primary criteria (PC) where each $W_i$, $1 \leq i \leq N$, denotes a weight for a corresponding "ith" one of the primary criteria $PC_i$.

In this manner, EQUATION 2 may be used as one way in which different ones of the primary criteria may be given different relative priority or weighting with respect to other ones of the primary criteria. It should be noted that in the same manner, EQUATION 2 may be used to more generally determine a score for any set of criteria, such as primary criteria, secondary criteria, as well as other levels of criteria that may be used in embodiment.

An embodiment in accordance with techniques herein may define a hierarchy of levels of criteria which, as described above may include 2 general levels of criteria—primary and secondary criteria—where each level may include or more criteria. More generally, the levels of criteria may include any suitable number of levels, such as more than 2 levels, each of which includes one or more criteria for that level. To further illustrate, an embodiment in accordance with techniques herein may include 2 levels of criteria, such as any of the primary and secondary criteria as described above in connection with FIGS. 7A and 7B. Furthermore, the embodiment may specify a third level of criteria that may be used for the set of proposed DMs having the same position in the ranking based on the primary criteria and the secondary criteria. In such a case, the third level of criteria may be used to further sort or rank the set of proposed DMs.

In one embodiment, the third level of criteria may include an indicator denoting whether the I/O workload directed to the slice of each proposed DM is read heavy or write heavy. For example, the third level of criteria may include an indicator as to whether the I/O workload is more than 50% read or more than 50% write. In such an embodiment, additional I/O statistics may be collected and maintained for each slice which includes a second read I/O workload statistic for reads directed to each slice and a third write I/O workload statistic for write directed to each slice. The foregoing read I/O workload statistic and write I/O workload statistic may be determined for each slice in a manner similar to that as for the cumulative I/O workload for each slice using EQUATION 1. In other words, EQUATION 1 may be applied for use in determining the cumulative I/O workload as noted above, and also determining the foregoing read I/O workload statistic and write I/O workload statistic for each slice. The read I/O workload statistic and write I/O workload statistic for each slice may be used in determining the third level indicator for a slice denoting whether the slice's I/O workload is primarily reads or writes. In one embodiment, the third level indicator may be used in connection with further ranking DMs having the same position in the ranking based on the primary and secondary criteria.

Consistent with discussion elsewhere herein, different classes or tiers of flash-based PDs may have varying endurance levels for writes or erasure cycles as known in the art. The above-noted third level of criteria may be used in an embodiment having multiple tiers of different types of flash PDs. For example, assume an embodiment has 4 storage tiers with relative performance ranking, from highest to lowest, as follows: tier 1 of SLC PDs, tier 2 of MLC PDs, tier 3 of 15K RPM PDs and tier 4 of 10K RPM PDs. In such an embodiment, tier 1 media may be preferred for write heavy I/O workloads. For example, consider ranking a first proposed data movement and a second proposed data movement where both such data movements have the same position in the ranking based on the primary and secondary criteria and both data movements are promotions for slices to tier 1 of SLC PDs. In this case, the proposed data movement which is write heavy may be ranked higher than the remaining proposed data movement which may be read heavy. As a variation, consider ranking a first proposed data movement and a second proposed data movement where both such data movements have the same position in the ranking based on the primary and secondary criteria and both data movements are promotions for slices to tier 2 of MLC PDs. In this case, the proposed data movement which is read heavy may be ranked higher than the remaining proposed data movement which may be write heavy.

Referring to FIG. 7C, shown is another example 500 including a list of proposed data movements (DMs) 510 as may be determined in an embodiment in accordance with techniques herein. The list 510 may be ranked in accordance with the primary and secondary criteria as just described above. The list 510 may include a row of information as may be used in an embodiment in accordance with techniques herein for each slice proposed for data movement in one of the proposed data movements output by the data storage optimizer. Each entry in the ranked list 510 may have a position in the ranked listed determined in accordance with primary criteria, secondary criteria and additionally a third level of criteria. Each entry in 510 may denote a proposed data movement and may include an indicator 512 identifying an application priority, an indicator 514 identifying a QOS or quality of service level for the affect slice, the I/O workload 516 for the affected slice (e.g., as determined using EQUATION 1 for cumulative I/O workload of both reads and writes), and an identifier 518 for the slice of the proposed data movement.

Column 512 may identify one of a predefined set of application priorities denoting a priority of the application whose data is stored in a slice of a proposed data movement. For example, in one embodiment having a predefined set of application N (N>0) priorities, 1 may denote the highest priority application and N may denote the lowest application priority. If a particular slice of a proposed data movement includes data for which the application priority is not applicable, a zero may be included in the application priority column 512 for that particular data movement.

Column 514 may identify one of a predefined set of QOS levels denoting a priority or importance of particular slices within a same application whose data is stored in a slice of a proposed data movement. For example, in one embodiment having a predefined set of QOS N levels N being an integer greater than 0), 1 may denote the highest QOS level of slice importance and N may denote the lowest QOS level of slice importance for a particular application.

DMs 520a-520g denote the particular proposed data movements as ranked in the list where DM 520a denotes the highest ranked data movement and DM 520g denotes the lowest ranked data movement. Column 512 may specify the single primary criteria. Column 514 may specify the single secondary criteria. Column 516 may specify the single third level criteria.

DMs 520a-b each include the same primary criteria which is the highest application priority of 1 in column 512 and may therefore be ranked further based on secondary criteria or QOS 514. In this example, DM 520a has a QOS level of 1 which is a higher QOS level than 2 as specified for DM 520b. Accordingly, 520a is ranked first or highest in the list followed by 520b.

Since DMs 520c-d each include the same primary criteria which is the application priority of 2 in column 512, DMs 520c-d may therefore be ranked further based on secondary criteria or QOS 514. In this example, DM 520c and DM 520d both have the same QOS level of 1 so processing to ranking the entries further proceeds to examine the third level of criteria as denoted in column 516 for 520c-d. The higher the I/O workload, the higher the ranking of the proposed DM list. Thus, in this example, assume X3>X4 resulting in the ranking of 520c followed by 520d as in the example 500.

Since DMs 520e-g each include the same primary criteria which is the application priority of 3 in column 512, DMs 520e-g may therefore be ranked further based on secondary criteria or QOS 514. Based on the secondary criteria or QOS level in column 514 for 520e-g, the DMs may be accordingly relatively ranked, from highest to lowest, as 520e, 520f, and 520g as illustrated in the example 500.

An embodiment may select a number or amount of the proposed data movements to implement at a point in time using any suitable technique some of which are described herein.

As described herein, an embodiment may use a heuristic, such as based on a particular workload skew for slices under consideration, to determine a number or percentage of proposed data movements to implement at a single point in time. For example, as noted elsewhere herein, the I/O workload of slices for which data movements have been proposed may have an 80-20 workload skew where 80% of the I/O workload may be generally directed to approximately 20% of the slices. In this case, the highest ranked 20% of the proposed data movements may be implemented at each point in time, such as each time period (e.g., hourly) during which I/O statistics are collected and then revised I/O workloads (e.g., using EQUATION 1) are calculated.

Rather than specify a particular amount or percentage of proposed data movements to implement each time period (such as each time period when revised I/O statistics are collected and determined), an embodiment may alternatively take an incremental approach and implement proposed data movements, in order of highest to lowest ranking in the list (where the ranking is determined in accordance with the one or more criteria), until a specified performance level has been obtained or until a specified amount of performance improvement (e.g., such as decrease in average I/O response time) has been achieved. In one embodiment, modeling may be used to determine the expected performance if selected proposed data movements are implemented. In such an embodiment, modeling may be used to determine the number of proposed data movements to subsequently implement to obtain a specified level of performance, specified level of performance improvement (e.g., percentage of improvement in performance with respect to a current observed average I/O RT), and the like. As an alternative, an embodiment may incrementally implement sets of proposed data movements, measure the observed actual performance and determine whether to implement additional proposed data movements for a current time period based on the actual observed performance.

As yet another variation, an embodiment may select a number of proposed data movements to implement based on a time limit consumption. For example, each hour, proposed data movements may be selected from the ranked list, with highest ranking proposed data movements being selected prior to any lower ranked proposed data movement, as described above. The number of proposed data movements actually performed or implemented may be subject to a time limit consumption, such as 5 minutes of wall clock time. Once the 5 minute time limit is reached for one hour, processing in accordance with techniques herein may stop and then resume at the next scheduled hour for another 5 minutes. In this manner, the number of proposed data movements implemented is whatever number can be implemented during each 5 minute time period per hour.

As yet another variation, an embodiment may select for implementation at each time period, such as each hour, all proposed data movements of the current list having a specified level of criticality in the ranked list of proposed data movements. For example, with reference back to FIG. 7A, an embodiment may select for implementation in each time period (e.g., each hour), all proposed data movements meeting any one of the specified primary criteria denote in columns 312 and 314. In this manner, all proposed data movements to move slices containing rather file system metadata or application critical data may be implemented each time period, such as each hour denoting a new statistics collection and analysis period and each hour denoting a time period when the data storage optimizer may output a new revised list of proposed data movements taking into account the most recent/current set of workload data for the current time period. As another example, with reference back to FIG. 7C, an embodiment may select for implementation in each time period all proposed data movements of the current list having at least a specified minimum application priority as denoted in column 512 (e.g., all proposed data movements with an application priority of 1, or all proposed data movements of the current list with an application priority of at least (e.g., 1 or 2)).

In this manner, the amount of proposed data movements implemented each time period (e.g., such as each hour denoting a new statistics collection and analysis period and also denoting each time period at which a new list of data movements is determined (based on the new/latest statistics collect) is based on criteria denoting at least a threshold level of criticality.

Figure 7D:
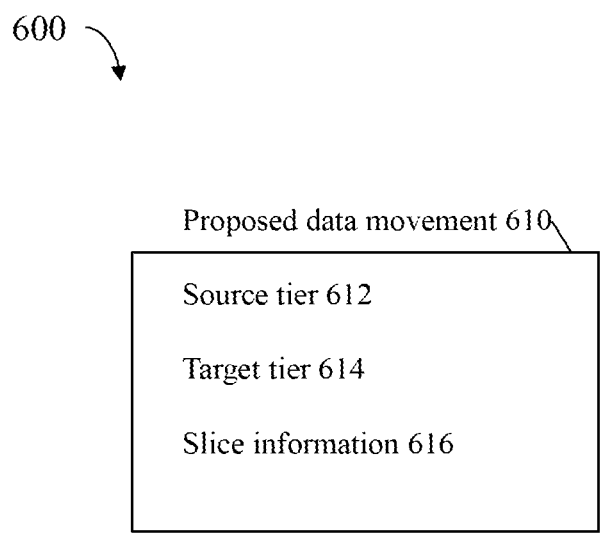
FIG. 7D is an example illustrating additional information that may be specified for each proposed data movement determined by the data storage optimizer in an embodiment in accordance with techniques herein.

Referring to FIG. 7D, shown is an example 600 of information that may be output by the data storage optimizer for each proposed data movement 610. For each proposed data movement 610 determined by the data storage optimizer, information output by the data storage optimizer may include, for example, the source tier 612 (currently including the slice for which the data movement is proposed), the target tier 614 (denoting the target tier to which the slice would be moved if this proposed data movement 610 is implemented), and slice information 616. The slice information 616 may identify the particular slice of data to be moved (e.g., LUN and LBA, current physical device location such as storage pool, location in the pool, and the like). The information of the example 600 for each proposed data movement may be used with techniques herein in addition to the information generally described and illustrated in FIGS. 7A-7C.

Figure 8:
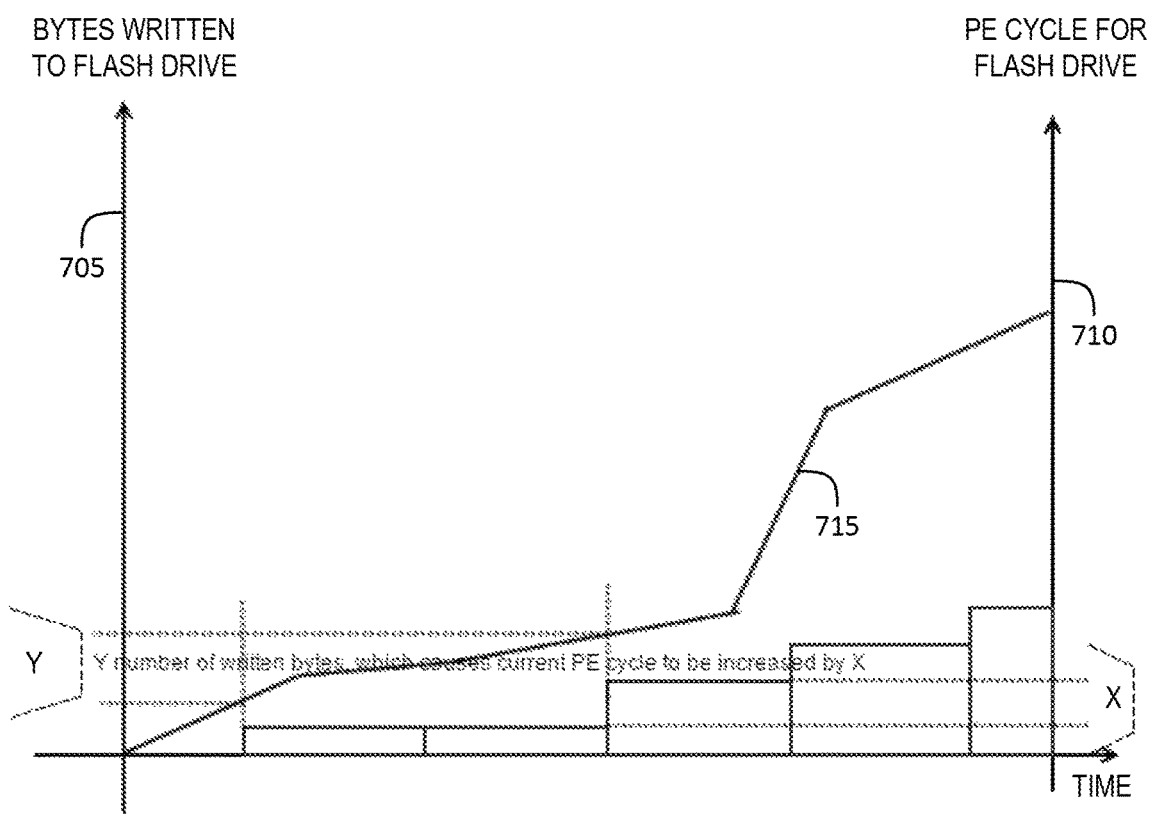
FIGS. 8 and 9 are graphical representations illustrating an example embodiment that may utilize the techniques described herein.

FIG. 8 depicts a graphical representation illustrating SSD wear data collection and analysis techniques according to an example embodiment. With reference to logical address space corresponding to a particular slice, slice statistics may be generated for each slice that include, but not limited to, number of IOPs, number of blocks written. Flash drive statistics may also be generated for each SSD that includes the drive's maximum PE cycle count, current PE cycle count, and hours to end of warranty (EOW).

The left Y axis 705 represents the number of bytes or blocks written to a SSD. This may be determined by summing the slice statistics for all or substantially all the slices stored on a particular SSD. Thus, the sum of the bytes written to each slice may represent the number of bytes written to the corresponding SSD. The right Y axis 710 represents the number of current PE cycles for the SSD. The current PE cycle, max PE cycle, and hours to EOW may be determined by querying the SSD of interest and/or a corresponding data structure maintained by storage system. The X axis represents time over which the bytes are written and PE cycles occur. When the graph is viewed as a whole, the activity line 715 represents the Y 705 number of bytes written to the SSD that causes the current PE cycle to increase by X, that is, how many bytes causes the PE cycle count to increase. Put another way, as Y 705 number of bytes causes X 710 change in cycle count, then Y/X bytes written causes the PE cycle to increase by 1.

Given that an SSD has a max PE cycle count and that we can determine the current PE count, the remaining number of PE cycles to EOW can be calculated by subtracting the current PE cycle count from the max PE cycle count. With this information and calculating Y/X as described above, the number of bytes that can be written to the SSD before the SSD reaches EOW can be calculated as follows:

$$\text{Bytes written to EOW} = (\text{Max PE} - \text{Current PE}) * (Y/X) \quad \text{EQUATION 3}$$

SSDs can be rated as having a number of writes per hour to EOW. For example, a SSD may be specified as being able to perform 3 writes per hour for a period of 5 years. If we know that a drive has W hours to EOW, the number of bytes per hour that can be written to the SSD before it reaches EOW may be calculated as follows:

$$Q = (\text{Max PE} - \text{Current PE}) * (Y/X) * W; \quad \text{EQUATION 4}$$

Where Q=bytes written per hour to reach EOW, and W is number of hours until EOW

Thus, if Q bytes are written per hour, the drive will not wear out before the EOW period.

Figure 9:
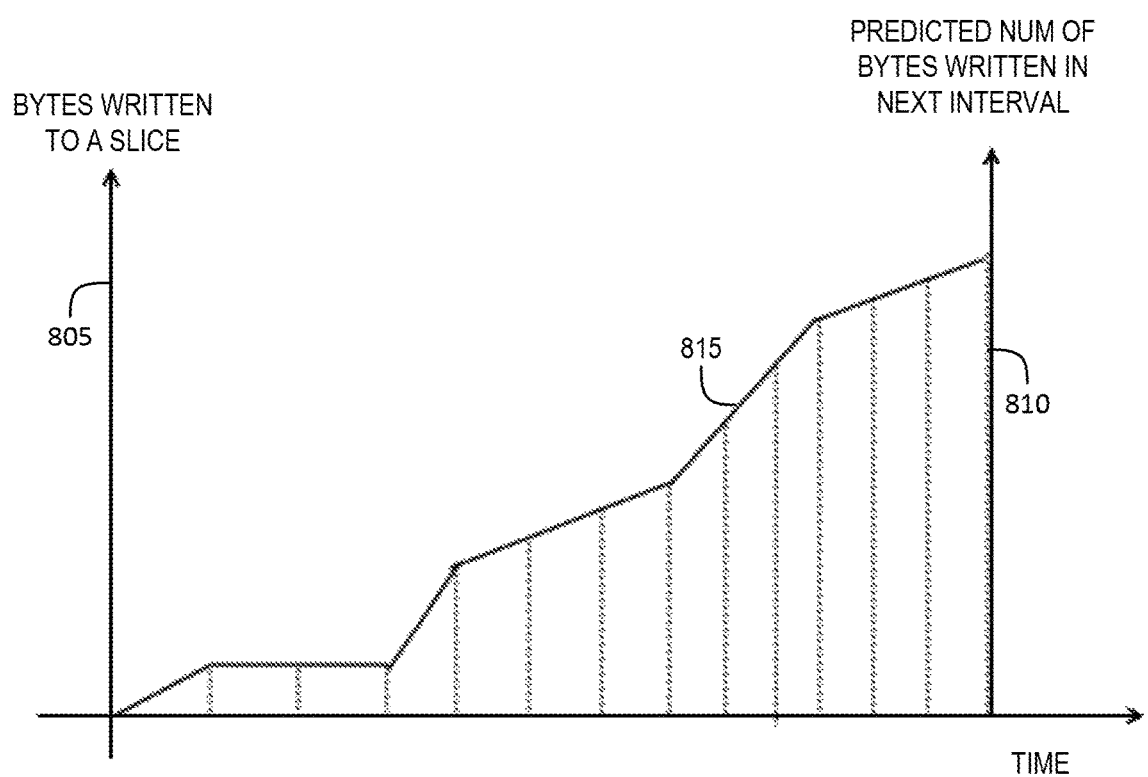

FIG. 9 is a graphical representation illustrating an example embodiment employing the techniques described herein. The left Y axis 805 represents the number of bytes written to a particular slice. The right Y axis 810 represents a predicted number of bytes that will be written in the next time interval, the time axis is segmented according to the time intervals.

Data storage systems employing data movement methods such as the FAST methods described elsewhere herein, slice data typically exhibits special and temporal locality access characteristics that enable predicting the number of bytes that will be written to a particular slice in a next time interval based on previous write activity. As described above, slice statistics are determined for each slice stored on the data storage system and these statistics can be used to estimate the number of bytes that will be written to the slice during the next time interval. For example, in one example embodiment, the predicted number of bytes written to a slice in the next time interval may be estimated performing an linear or similar extrapolation of bytes written during a number of previous time intervals. In another example embodiment, a linear or similar extrapolation may be performed. In another embodiment, a moving average using n samples as a history may be used. In another example embodiment, simply the number of bytes written in the previous time interval may be used, where the smaller the time interval, the closer the estimate will track the actual number of bytes written. Other estimation methods may be similarly implemented.

Using the techniques described above for analyzing slice and drive information, the estimated number of bytes to be written to a SSD can be determined. For example, for a particular SSD, the slices stored on the SSD can be determined. The number of the estimated writes for all the slices stored on the SSD can be calculated to determine the of estimated writes for the SSD. With this information, a ratio representing SSD wear rate may be determined using the following:

$$\text{Wear rate} = \text{SumWR}/Q \qquad \text{EQUATION 5}$$

where SumWR is the estimated number of writes for a SSD and Q is determined using EQUATION 4 as described above. Accordingly, increasing SumWR increases the ratio value, representing an increased wear rate; conversely decreasing SumWR decrease the ratio value, representing a decrease wear rate. Thus, determining slice statistics and analyzing drive parameters provides the ability to determine a SSD's wear rate. Executing the technique for a set of SSDs enables identifying SSDs that may wear out before a specified warranty period. The technique further provided a mechanism to identify slices on such drives and move one or more slices to drives having lower wear rates so as to balance wear across a set of drives or substantially all the drives in a storage system.

Figure 10:
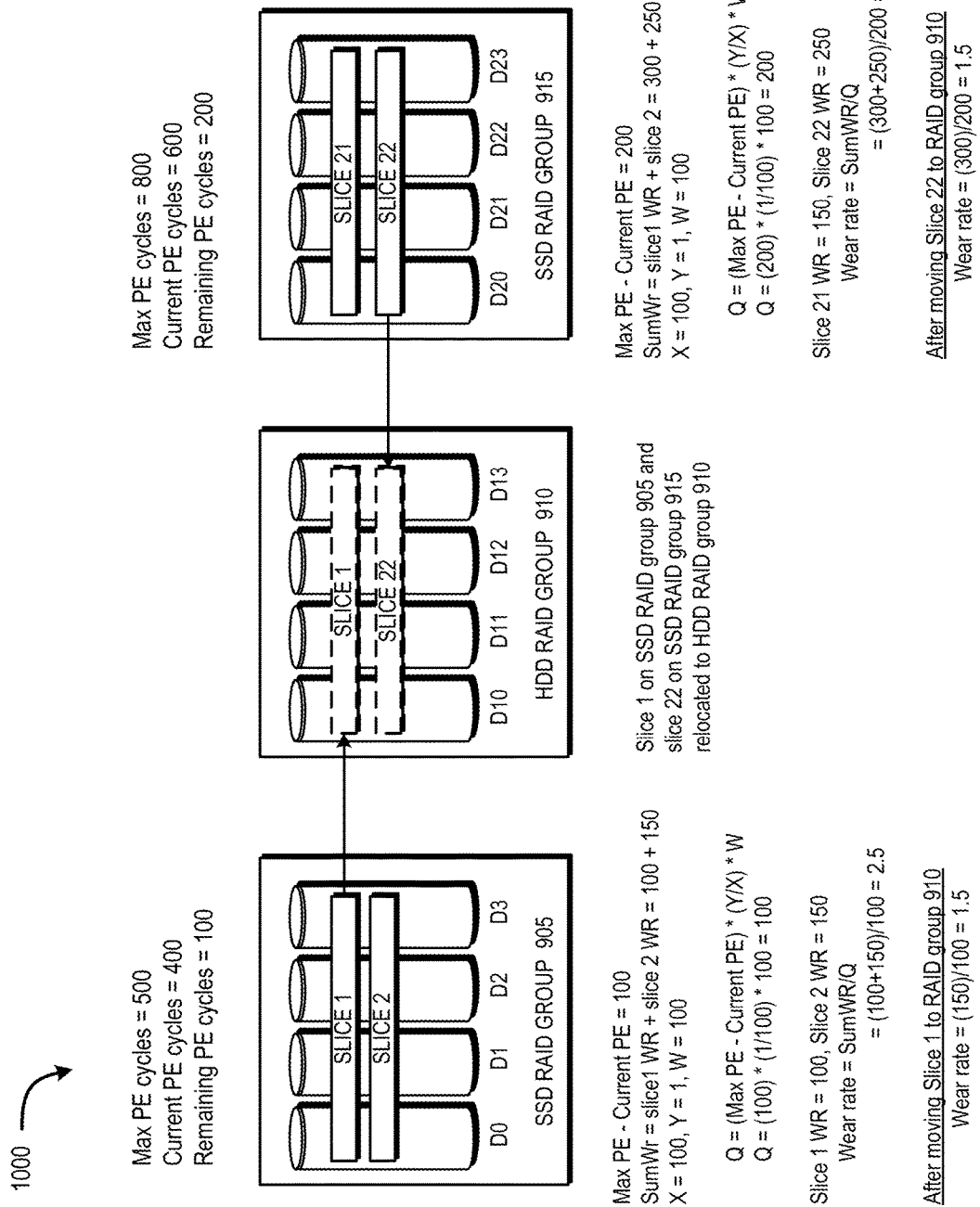
FIG. 10 is an example of a system that may utilize the technique described herein.

FIG. 10 illustrates an example embodiment 1000 of a data storage system implementing the techniques described herein for managing SSD wear in hybrid storage arrays. Shown are a plurality of flash drives arranged into two SSD RAID group configurations where SSD RAID group 905 includes flash drives D0-D3 and SSD RAID group 915 includes flash drives D20-D23. HDD RAID group 910 includes a plurality of HDD drives D10-D13. Initially, SSD RAID group 905 has slices 1 and 2 stored thereon, and SSD RAID group 915 has slices 21-22 stored thereon and HDD RAID group 910 is empty. Although the technique is shown as applied to RAID groups, the technique can be applied essentially any combination of SSD and HDD drives in or more storage arrays. Alternatively, or in addition, the technique may be applied to one or more storage pools, such storage pools described in FIG. 4.

SSD RAID group 905 has a max PE cycle specification of 500, where the current PE cycle count=400 and, therefore, the remaining PE cycle count=100. X=100, which represents, the number of bytes that causes Y, the PE count, to increase by 1. Thus, Y/X=1/100=0.01. W, the number of time intervals at which the EOW is reached=100. Consequently, applying EQUATION 4 as discussed above, Q=(Remaining PE count)*(Y/X)*W=(100)*(0.01)*100=100. After analyzing drive statistics, the technique turns to the slices stored on the SSD RAID group 905 flash drives. WR represents the estimated number of bytes that will be written to a particular slice. Here, slice 1 has a WR=100 and slice 2 has a WR=150. Applying EQUATION 5, the wear rate ratio for SSD RAID group 905=SumWR/Q=(100+150)/100=2.5. At this rate, the flash drives will wear out before the EOW is reached.

The technique is applied to the next RAID group in a similar manner. For example, SSD RAID group 915 has a max PE cycle specification of 800, where the current PE cycle count=600 and, therefore, the remaining PE cycle count=200. X=100, which represents, the number of bytes that causes Y, the PE count, to increase by 1. Thus, Y/X=1/100=0.01. W, the number of time intervals at which the EOW is reached=100. Consequently, applying EQUATION 4 as discussed above, Q=(Remaining PE count)*(Y/X)*W=(200)*(0.01)*100=200. After analyzing drive statistics, the technique turns to the slices stored on the SSD RAID group 915 flash drives. WR represents the estimated number of bytes that will be written to a particular slice. Here, slice 21 has a WR=150 and slice 2 has a WR=250. Applying EQUATION 5, the wear rate ratio for SSD RAID group 915=SumWR/Q=(300+250)/200=2.75. At this rate, the flash drives of SSD RAID group 915 will also wear out before the EOW is reached.

HDD RAID group 910 is a group of HDD. Unlike SSD drives, HDD drives are not limited to a specified number of write operations per se, that is, HDD drives do not suffer SSD-like wear out, and for the purposes of storage arrays, they can be considered as able to perform an essentially unlimited number of write operations from a media wear perspective. The wear determination techniques may the implemented identify SSD RAID groups experiencing relatively high wear rates such that their remaining PE cycle count may reach 0 before its correspond EOW. To reduce the wear rate and/or balance wear across all the flash drives evenly, the technique moves one or more slices from SSD drives experiencing a high wear rate to an HDD RAID group. In this example, slice 1 is moved from SSD RAID group 905 to HDD RAID group 910 and slice 22 is moved from SSD RAID group 915 to HDD RAID group 910.

When relocating slices from an SSD RAID group to an HDD RAID group, the particular HDD RAID group may be determined using the techniques describe elsewhere herein, such as those discussed with reference to FIGS. 7A-7D. For example, in one example embodiment, slices having a high temperature (e.g., HOT) may be prioritized for relocation. In another example embodiment, slices having write heavy data may be selected for relocation. In other example embodiments, factors such as file system metadata, I/O workload, Application priority, QOS and the like may also be factored into the determination when identifying slices for relocation. In addition, or alternatively, HDD factors may also be considered when relocating slices stored on SSD including, but not limited to, HDD performance characteristics (e.g., rotation speed, architecture, configuration, etc.), storage tier, and temperature of data stored on the HDD (e.g., HDD I/O workload).

Figure 11:
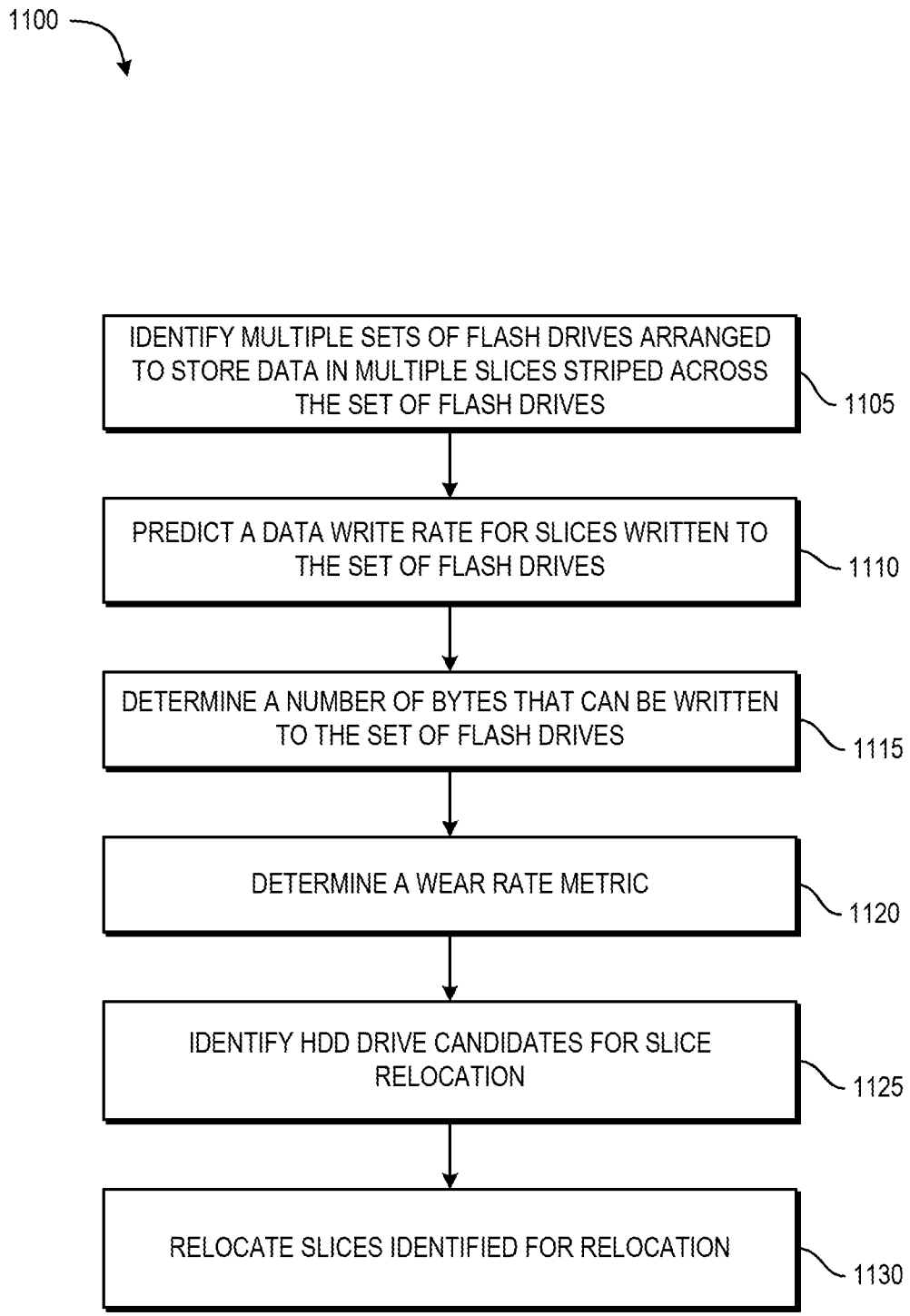
FIG. 11 is a flowchart of the technique illustrating processing steps that may be performed in an embodiment in accordance with techniques herein.

FIG. 11 depicts a flow diagram illustrating example embodiments of a method 1100 according to various implementations for use in managing SSD wear rate in storage arrays. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention. The operations may be performed in hardware, or as processor-executable instructions that may be executed by a processor. Furthermore, the method 1100 may, but need not necessarily, be implemented using the data storage system of FIG. 1 and may also be implemented, in or in combination with, for example, a server, storage appliance, network device, cloud storage system, virtualization appliance, software defined storage, or other such implementation comprising or exercising flash based SSDs. The SSDs may be constructed using different types of memory technologies such as nonvolatile semiconductor NAND flash memory forming one or more SLC devices and/or MLC devices. The SSDs may be arranged in a RAID configuration in one or more data storage systems. Alternatively, or in addition, flash drives may be configured as a storage tier in the data storage system, wherein the storage tier is one of multiple storage tiers, the multiple storage tiers having progressively better response time characteristics. The HDD drives may be one or more different type of drives having one or more performance ratings and characteristics.

Referring to FIG. 11, with reference to the system of FIG. 1 and the SSDs of FIG. 10, the method 1100 provides a mechanism to, for example, identify the wear rate of an SSD or flash drive. When data is arranged, for example, as a slice stored on a LUN, the slices are mapped to physical drives using a mapping layer. The data may be stored such that a first RAID group(s) stores slices that are write heavy while a second RAID group(s) stores less write heavy and/or read heavy data slices. In such a case, the first RAID group will experience a wear rate significantly higher than the second RAID group. Since SSD flash drives have a limited write capability, the first RAID group may fail earlier than desired. For example, a storage array comprising SSD flash drives may have a 5 year warranty period. The array may be designed such that an SSD flash drive engineered perform a certain number of write operations over the 5 year warranty, and under normal operations, such warranty periods are sufficiently satisfied. However, extreme wear patterns such as those described above may cause an SSD to wear faster that the systems design parameters resulting in a failure that is subject to a warranty claim. Conversely, a drive may experience significantly less write wear, and as a result, continue to operate well beyond it's warranty period. In this case, presuming that a user wants to make full use of performance an SSD offers, such and extension beyond expected operating life may be considered unused performance. Furthermore, the low wear rate SSD may be used to absorb wear being directed to the high wear rate SSD, thereby reducing its wear rate and extending its useful life.

The example embodiment depicted in FIG. 11 provides a mechanism to predict the wear rate of multiple SSD and balance the wear rate of the multiple SSDs such that they wear at approximately the same rate. It should be noted that although the techniques discuss SSDs in relation to a data storage system in various example embodiments, the techniques may be used in other systems having SSDs where the write commands may be sent to, for example, a server or virtualized storage where the flash wear reduction and performance improvements techniques may be similarly applied.

At step 1105, the method identifies multiple sets of flash drives, where each set of flash drives are arranged to store multiple slices of data where the slices are striped across a group of SSD in, for example, a RAID configuration. Although the technique is described using RAID configuration, various alternative embodiments may implement other various configurations and arrangements.

At step 1110, the method predicts a write rate for each set of flash drives. That is, for each slice stored on the set of flash drives, the rate as which data will be written to the flash drive in the next time interval will be predicted. In one embodiment, the pervious actual data write rate will be used. In the case where the time intervals are relatively short, as a result of temporal and special locality, the predicted write rates will be fairly accurate as they will predictably lag the actual rate in an acceptable manner. In other various example embodiments, the rate may be determined by performing a moving average averaging n previous recorded write rates, performing a linear fit or similar such extrapolation. The predicted number of expected writes may be referred to as WR. Slice and drive information may be analyzed such that WR can be determined for each slice on an SSD RAID group. The sum of the expected writes for all the slices stored on RAID group's SSD flash drives may be referred to as SumWR.

At step 1115, the number of remaining PE cycles (i.e., number of remaining write operations) that can be performed by SSD RAID group flash drives may be determined. For example, if a RAID group has a max PE cycle count of 500, and its current PC cycle count is 400, there are 100 remaining PE cycles before the drive is at the end of it's specified PE cycle count and considered "worn out." While the drive may not fail immediately, the drive cannot be expected to reliably store data from that point forward.

At step 1120, a metric representative of a wear rate may be determined for each RAID group in a manner as was discussed in FIG. 10. In one example embodiment, the wear metric may be expressed as a ratio SumWR (the sum of the expected writes to slices on the RAID group) and Q (the number of write bytes/hour before remaining cycle count=0). Other metrics using the parameters discussed above may be implemented in a similar manner. As shown in FIG. 10, SSD RAID group 905 has a determined wear rate of 2.5 and SSD RAID group 915 has a wear rate of 2.75. If these wear rates are determined to be relatively high compared to one or more other RAID groups, slices stored on RAID groups 905 and 910 may be remapped or migrated to other RAID groups having a lower wear rate such as HDD RAID group 910.

At step 1125, the method identify HDD RAID group candidates for relocations of slices identified for relocation. Slices may be relocated in a manner such that the techniques maximizes the SSD RAID group performance while ensuring the SSD do not reach a wear out state before an EOW or other interval period. The process of identifying SSD slices for relocation and identifying HDD candidates may be performed using knapsack problem solving algorithms, dynamic programming greedy algorithms, and the like.

The particular HDD RAID group candidates may be determined using the techniques describe elsewhere herein, such as those discussed with reference to FIGS. 7A-7D. For example, in one example embodiment, slices having a high temperature (e.g., HOT) may be prioritized for relocation. In another example embodiment, slices having write heavy data may be selected for relocation. In other example embodiments, factors such as file system metadata, I/O workload, Application priority, QOS and the like may also be factored into the determination when identifying slices for relocation. In addition, or alternatively, HDD factors may also be considered when relocating slices stored on SSD including, but not limited to, HDD performance characteristics (e.g., rotation speed, architecture, configuration, etc.), storage tier, and temperature of data stored on the HDD (e.g., HDD I/O workload).

At step 1130, slices identified for relocation are relocated to the HDD RAID groups identified in step 1125. The relocation process may be performed immediately, during a scheduled time period (e.g., evening off hours or other low use periods), periodically, aperiodically, on demand via a user or system software, event triggered, and the like.

While the above description refers to a data storage system or array having flash based SSD, the techniques may be similarly applied according to alternative embodiments directed to other systems implementing flash based SSDs such as servers, network processors, compute blocks, converged systems, virtualized systems, and the like. Additionally, it should be appreciated that the technique can apply to block, file, object and/or content architectures.

It will be appreciated that an embodiment may implement the technique herein using code executed by a computer processor. For example, an embodiment may implement the technique herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method for use in balancing solid state drives (SSD) wear in data storage systems, the method comprising:
   identifying multiple sets of SSDs and multiple sets of hard disk drives (HDDs), wherein each set of SSDs and HDDs store data arranged in multiple slices striped across the respective set of SSDs and HDDs;
   predicting, for each set of SSDs, a write rate at which data will be written to the multiple slices stored on the set of SSDs during a next time interval;
   determining, for each set of SSDs, a number of bytes that can be written to each set of SSDs, wherein the number is based on a remaining program/erase (PE) cycle count for each respective set of SSDs;
   determining, for each set of SSDs, a wear metric representative of a wear rate corresponding to the set of SSDs, the metric based on a SSDs' determined predicted write rate and the determined number of bytes that can be written to each set of SSDs;
   identifying one or more HDDs as candidates for relocating slices stored on a set of SSDs, wherein the set of SSDs is predicted to wear out before reaching an end of an interval period; and
   initiating a relocation process to relocate slices identified for relocation.

2. The method as claimed in claim 1, wherein the end of an interval period is an end of warranty period associated with the SSD on which the slices identified for relocation reside.

3. The method as claimed in claim 1, wherein SSD slices having a hot temperature are assigned a high priority for relocation.

4. The method as claimed in claim 1, wherein SSD slices storing metadata are assigned a high priority for relocation.

5. A system for use in balancing SSD wear in data storage systems, the system comprising:
   a storage processor and memory configured to:
      identify multiple sets of SSDs, wherein each set of SSDs store data arranged in multiple slices striped across the set of SSDs;
      predict, for each set of SSDs, a write rate at which data will be written to the multiple slices stored on the set of SSDs during a next time interval;
      determine, for each set of SSDs, a number of bytes that can be written to each set of SSDs, wherein the number is based on a remaining program/erase (PE) cycle count for each respective set of SSDs;
      determine, for each set of SSDs, a wear metric representative of a wear rate, the metric based on a respective SSDs determined predicted write rate and the determined number of bytes that can be written to each set of SSDs;
   identify one or more HDDs as candidates for relocating slices stored on a set of SSDs, wherein the set of SSDs is predicted to wear out before reaching an end of an interval period; and
   initiate a relocation process to relocate slices identified for relocation.

6. A computer-program product including a non-transitory computer-readable storage medium encoded with computer-program code that, when executed on a processor of a computer, causes the computer to manage data storage in a data storage system, the computer-program product further comprising:
   identifying multiple sets of solid state drives (SSDs1 and multiple sets of hard disk drives (HDDs), wherein each set of SSDs and HDDs store data arranged in multiple slices striped across the respective set of SSDs and HDDs;
   predicting, for each set of SSDs, a write rate at which data will be written to the multiple slices stored on the set of SSDs during a next time interval;
   determining, for each set of SSDs, a number of bytes that can be written to each set of SSDs, wherein the number is based on a remaining program/erase (PE) cycle count for each respective set of SSDs;
   determining, for each set of SSDs, a wear metric representative of a wear rate corresponding to the set of SSDs, the metric based on a SSDs' determined predicted write rate and the determined number of bytes that can be written to each set of SSDs;
   identifying one or more HDDs as candidates for relocating slices stored on a set of SSDs, wherein the set of SSDs is predicted to wear out before reaching an end of an interval period; and
   initiating a relocation process to relocate slices identified for relocation.

* * * * *